United States Patent [19]

Rogers

[11] Patent Number: 4,939,843

[45] Date of Patent: Jul. 10, 1990

[54] PORTABLE HANDHELD CIRCULAR SAW

[76] Inventor: Ronald S. Rogers, 10755 Felix Dr., Santee, Calif. 92071

[21] Appl. No.: 407,266

[22] Filed: Sep. 14, 1989

[51] Int. Cl.$^5$ .............................................. B23D 45/16
[52] U.S. Cl. ........................................ 30/388; 30/514
[58] Field of Search ................. 30/388, 389, 390, 391, 30/514; 439/915, 926

[56] References Cited

U.S. PATENT DOCUMENTS 4,555,849  12/1985  Ando et al. ........................... 30/388
4,787,145  11/1988  Klicker et al. ........................ 30/388

FOREIGN PATENT DOCUMENTS 3220869  12/1983  Fed. Rep. of Germany ........ 30/388

*Primary Examiner*—Frank T. Yost
*Assistant Examiner*—Willmon Fridie, Jr.
*Attorney, Agent, or Firm*—Charles C. Logan, II

[57] ABSTRACT

A portable handheld circular saw having a C-shaped handgrip housing that is attached to the rear end of a motor housing. A trigger switch is mounted in the handgrip housing and a first pair of electrical wires have one of their ends connected to the input side of the trigger switch. The opposite ends of the first pair of electrical wires would have a male electrical connector secured thereto. A second pair of electrical wires has one of their ends connected to the output side of the trigger switch and their opposite ends connected to an electric motor in the motor housing. A third pair of electrical wires have one of their ends connected to the input side of the trigger switch and their opposite ends connected to an auxiliary female electrical socket that is installed in an aperture that has been formed in either the motor housing or the handgrip housing.

4 Claims, 1 Drawing Sheet

PORTABLE HANDHELD CIRCULAR SAW

BACKGROUND OF THE INVENTION

The invention relates to circular saws and more specifically to a portable handheld circular saw.

Presently framers and carpenters working in the housing and building construction field utilize portable handheld circular saws a great deal. These circular saws generally have at least a twenty foot electrical cord and as much as a one hundred foot cord that has a male electrical connection secured to its one end. Often times it is necessary for the framer or carpenter to utilize another electrically powered tool while working. When this occurs, it is often necessary for the worker to return to the electrical outlet where the portable handheld circular saw is plugged in. Then he unplugs the saw and plugs in the tool of his choice which generally has a three to five foot cord and which needs another extension cord. This work situation is not convenient or time efficient.

It is an object of the invention to provide a novel portable handheld circular saw with an auxiliary female electrical socket that is wired into the circuit of the portable handheld circular saw.

It is also an object of the invention to provide a method for retrofitting existing portable handheld circular saws with an auxiliary female electrical socket into which other electrically powered tools can be connected.

It is another object of the invention to provide a novel portable handheld circular saw that is more versatile than such saws presently existing in the market place.

It is further object of the invention to provide a portable handheld circular saw with an auxiliary female electrical socket that will save time and money during construction operations.

SUMMARY OF THE INVENTION

Applicant's novel portable handheld circular saw has been designed to incorporate an auxiliary female electrical socket that is mounted in an aperture formed in either the motor housing or C-shaped handgrip housing. A pair of electrical wires have one of their respective ends connected to the input side of the trigger switch mounted in the handgrip housing. The opposite ends of the wires are connected to the auxiliary female electrical socket that is mounted in the aperture formed in either the motor housing or the handgrip housing. This provides structure which allows the carpenter or framer using the circular saw to easily connect the male electrical socket of any of his electrically powered tools to the circular saw. This eliminates the need to disconnect the circular saw at its power source and also eliminates time lost going back to the power source.

Applicant's novel structure for the portable handheld circular saw is applicable for newly manufactured portable handheld circular saws and by using a retrofit kit, existing circular saws can be adapted to give them the same versatility. To retrofit a circular saw, it is merely necessary to make an aperture of a sufficient diameter in either the motor housing or the handgrip housing to receive the auxiliary female electrical socket. A pair of electrical wires would have one of their respective ends connected to the input side of the trigger switch and their other respective ends connected to the auxiliary female electrical socket.

DESCRIPTION OF THE PREFERRED EMBODIMENT

Figure 1:
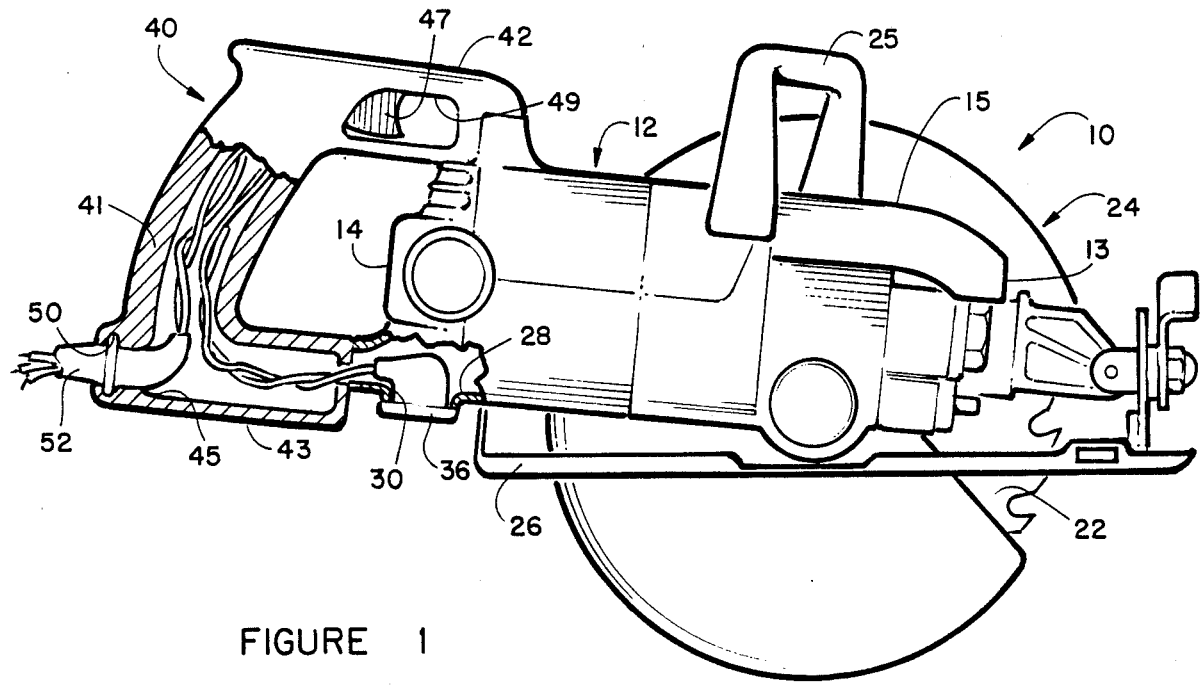
FIG. 1 is a side elevation view of Applicant's handheld circular saw with portions broken away for clarity.
Figure 2:
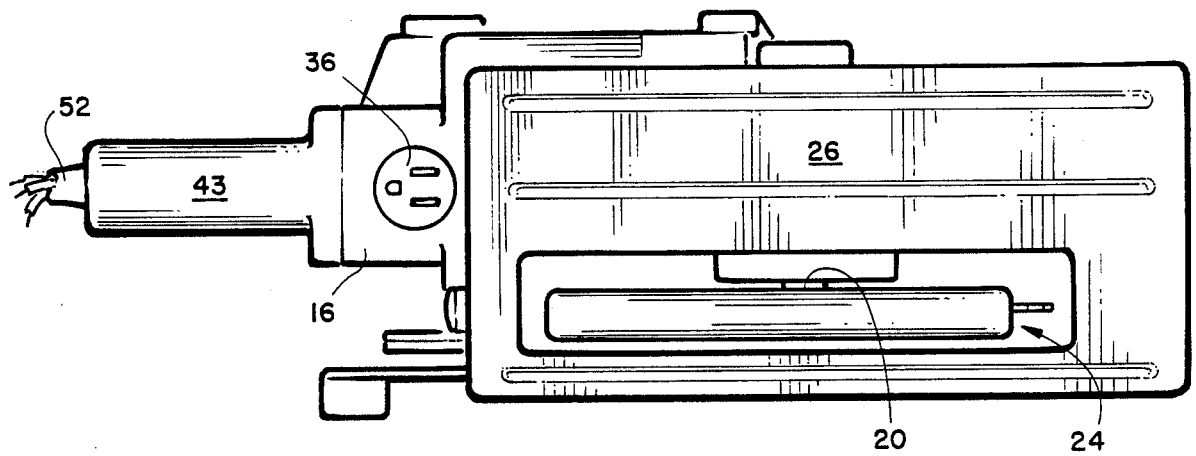
FIG. 2 is a bottom plan view of the portable hand held circular saw.
Figure 3:
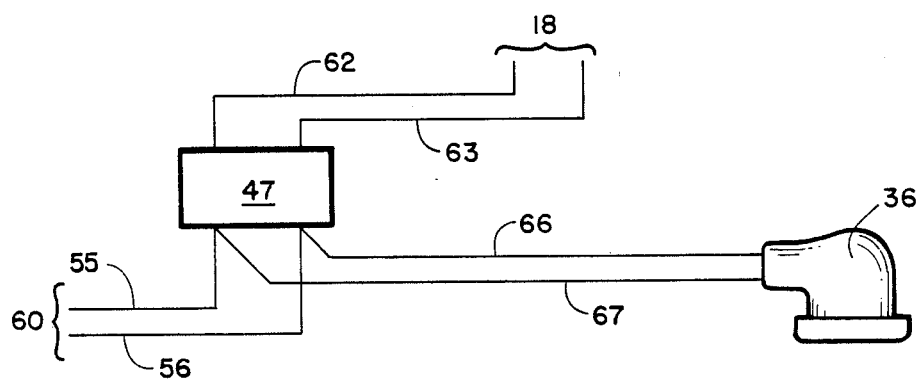
FIG. 3 is a schematic electrical diagram of the circuit for the modified portable handheld circular saw.

Applicant's novel portable handheld circular saw will now be described by referring to FIGS. 1-3 of the drawing. The circular saw is generally designated numeral 10.

Circular saw 10 has a motor housing 12 having a front end 13, a rear end 14, a top wall 15 and a bottom wall 16. A motor 18 having a drive shaft 20 is mounted in motor housing 12. A circular saw blade 22 is mounted on shaft 20 and it is surrounded by a blade guard housing 24. A rest plate 26 is attached to motor housing 12. A chamber 28 is formed in motor housing 12 and it communicates with an aperture 30 that is formed in bottom wall 16. An auxiliary female electrical socket 36 is mounted in aperture 30.

A C-shaped handgrip housing 40 has an upright portion 41, a top arm member 42 and a bottom arm member 43. A chamber 45 is formed in handgrip housing 40. A trigger switch 47 is mounted in chamber 45 and a portion of it extends into aperture 49 formed in top arm member 42. An aperture 50 is formed in the rear of handgrip housing 40 and a grommet 52 is mounted therein. A pair of electrical wires 55 and 56 have their one respective ends connected to a 110 A.C. power source 60 and their other ends connected to trigger switch 47. Electrical wires 62 and 63 have their one respective ends connected to trigger switch 47 and their other respective ends connected to electrical motor 18. Electrical wire 66 and 67 have their one respective ends connected to trigger switch 47 and their opposite respective ends connected to auxiliary female electrical socket 36.

What is claimed is:
1. A portable handheld circular saw comprising:
   a motor housing having a front end, a rear end, a top wall and a bottom wall;
   an electric motor having a drive shaft mounted in said motor housing;
   a circular saw blade mounted on said drive shaft;
   a blade guard housing surrounding most of said circular saw blade;
   a handgrip housing having a front end and a rear end, said front end being rigidly connected to the rear end of said motor housing, a chamber formed in said handgrip housing and a trigger switch having an electrical input terminal and an electrical output terminal and being mounted in said chamber;
   an auxiliary female electrical socket mounted in the bottom wall of said motor housing;
   a first pair of electrical wires having means on one of their respective ends for connecting them to an A.C. power source, the other end of said wires being connected to the input side of said trigger switch;
   a second pair of electrical wires having one of their ends connected to the output side of said trigger switch and their opposite ends connected to said electrical motor; and a third pair of electrical wires having one of their respective ends connected to the input side of said trigger switch and their opposite ends connected to said auxiliary female electrical socket.

2. A portable handheld circular saw as recited in claim 1 further comprising a handle attached to the top wall of said motor housing.

3. A portable handheld circular saw as recited in claim 1 wherein said handgrip housing has a C-shaped configuration.

4. The method of retrofitting a portable handheld circular saw to provide it with an auxiliary female electrical socket when the circular saw has a motor housing, a handgrip housing attached to said motor housing, a trigger switch having an electrical input terminal and being positioned in said handgrip housing comprising the following steps:

(a) making an aperture in one of said housings for receiving an auxiliary female electrical socket;

(b) taking a pair of electrical wires and connecting one of their respective ends to the electrical input side of said trigger switch and connecting the other respective ends to an auxiliary female electrical socket; and (c) installing said auxiliary female electrical socket into the aperture formed in one of said housings.

* * * * *